US010481561B2

(12) United States Patent
Lyman (10) Patent No.: US 10,481,561 B2
(45) Date of Patent: Nov. 19, 2019

(54) MANAGING HOME AUTOMATION SYSTEM BASED ON BEHAVIOR

(71) Applicant: Vivint, Inc., Provo, UT (US)

(72) Inventor: Jefferson Lyman, Alpine, UT (US)

(73) Assignee: Vivint, Inc., Provo, UT (US)

( * ) Notice: Subject to any disclaimer, the term of this patent is extended or adjusted under 35 U.S.C. 154(b) by 411 days.

(21) Appl. No.: 14/261,293

(22) Filed: Apr. 24, 2014

(65) Prior Publication Data

US 2015/0309484 A1 Oct. 29, 2015

(51) Int. Cl.
| G05B 21/00 | (2006.01) |
| G05B 13/02 | (2006.01) |
| H04L 12/28 | (2006.01) |

(52) U.S. Cl.
CPC ........ G05B 13/0205 (2013.01); H04L 12/282 (2013.01); H04L 12/2816 (2013.01)

(58) Field of Classification Search
CPC .................................................. G06F 13/0205
USPC ........................................................ 700/275
See application file for complete search history.

(56) References Cited

U.S. PATENT DOCUMENTS

| 4,987,402 | A | | 1/1991 | Nykerk | |
| 4,994,787 | A | | 2/1991 | Kratt et al. | |
| 5,086,385 | A | * | 2/1992 | Launey | G06F 3/04847 340/6.11 |
| 5,544,036 | A | * | 8/1996 | Brown, Jr. | G05D 23/1905 340/12.52 |
| 6,263,260 | B1 | * | 7/2001 | Bodmer | F24F 11/0034 236/46 R |
| 6,909,921 | B1 | * | 6/2005 | Bilger | G05B 15/02 700/14 |
| 6,912,429 | B1 | * | 6/2005 | Bilger | G08B 25/008 236/49.3 |
| 7,133,729 | B1 | * | 11/2006 | Wang | G05B 15/02 340/12.35 |
| 7,526,539 | B1 | | 4/2009 | Hsu | |
| 8,630,741 | B1 | | 1/2014 | Matsuoka et al. | |
| 9,230,560 | B2 | * | 1/2016 | Ehsani | G10L 21/06 |
| 9,337,663 | B2 | * | 5/2016 | Alberth, Jr. | G05B 15/02 |
| 2005/0064916 | A1 | | 3/2005 | Ozluturk et al. | |
| 2010/0289643 | A1 | | 11/2010 | Trundle et al. | |
| 2013/0009865 | A1 | | 1/2013 | Valik et al. | |

(Continued)

FOREIGN PATENT DOCUMENTS

GB 2218244 A * 11/1989 ............. G08B 29/12

OTHER PUBLICATIONS

PCT International Search Report for International Application No. PCT/US2015/056920, dated Mar. 25, 2016 (3 pp.).

(Continued)

*Primary Examiner* — Evral E Bodden
(74) *Attorney, Agent, or Firm* — Holland & Hart, LLP (57) ABSTRACT

Methods and systems are described for controlling settings of an automation system, such as a home and/or business automation system. According to at least one embodiment, an apparatus for controlling settings of an automation system includes a processor, a memory in electronic communication with the processor, and instructions stored in the memory which are executable by a processor to continuously detect user patterns of behavior with a home automation system, and adaptively update one or more settings of the home automation system based on the detected patterns of behavior.

20 Claims, 9 Drawing Sheets

(56) References Cited

U.S. PATENT DOCUMENTS

| | | | |
|---|---|---|---|
| 2013/0073094 A1* | 3/2013 | Knapton | F24F 11/0034 |
| | | | 700/278 |
| 2013/0204408 A1 | 8/2013 | Thiruvengada et al. | |
| 2013/0263034 A1 | 10/2013 | Bruck et al. | |
| 2014/0070959 A1 | 3/2014 | Bhargava et al. | |
| 2014/0171146 A1 | 6/2014 | Ma et al. | |
| 2014/0324192 A1* | 10/2014 | Baskaran | G05B 15/02 |
| | | | 700/19 |
| 2015/0105911 A1* | 4/2015 | Slupik | H04L 12/2816 |
| | | | 700/275 |
| 2015/0120000 A1* | 4/2015 | Coffey | H04L 12/2803 |
| | | | 700/13 |
| 2015/0162006 A1* | 6/2015 | Kummer | G07C 9/00571 |
| | | | 704/275 |

OTHER PUBLICATIONS

International Search Report and Written Opinion of the International Searching Authority for PCT/US2015/026914, dated Jul. 22, 2015.

Supplementary European Search Report for EP Application No. 15782981.3, dated Dec. 19, 2017 (7 pp.).

* cited by examiner

MANAGING HOME AUTOMATION SYSTEM BASED ON BEHAVIOR

BACKGROUND

Advancements in media delivery systems and media-related technologies continue to increase at a rapid pace. Increasing demand for media has influenced the advances made to media-related technologies. Computer systems have increasingly become an integral part of the media-related technologies. Computer systems may be used to carry out several media-related functions. The wide-spread access to media has been accelerated by the increased use of computer networks, including the Internet and cloud networking.

Many homes and businesses use one or more computer networks to generate, deliver, and receive data and information between the various computers connected to computer networks. Users of computer technologies continue to demand increased access to information and an increase in the efficiency of these technologies. Improving the efficiency of computer technologies is desirable to those who use and rely on computers.

With the wide-spread use of computers and mobile devices has come an increased presence of home automation and security products. Advancements in mobile devices allow users to monitor and/or control an aspect of a home or business. As automation and security products expand to encompass other systems and functionality in the home and/or business, opportunities exist for additional automated functionality that requires limited user input.

SUMMARY

Methods and systems are described for controlling settings of an automation system, such as a home and/or business automation system. According to at least one embodiment, an apparatus for controlling settings of an automation system includes a processor, a memory in electronic communication with the processor, and instructions stored in the memory which are executable by a processor to continuously detect user patterns of behavior with a home automation system, and adaptively update one or more settings of the home automation system based on the detected patterns of behavior.

In one example, the user patterns of behavior may be detected within a home monitored by the home automation system. The user patterns of behavior may be detected outside a home monitored by the home automation system. The detected pattern of behavior may be based at least in part on a geo-fence signal. The home automation system may include security features, and the one or more settings includes a security setting related to at least one of the security features. The one or more settings may include an HVAC setting. The one or more settings may include at least one light fixture setting of a home monitored by the home automation system. The instructions may be executable to determine a location of the user and update the HVAC setting based on an estimated time of arrival of the user to the house and the determined location of the user. The one or more settings may include at least one lock mechanism setting for a barrier.

Another embodiment is directed to a computer-program product for controlling a home automation system. The computer-program product includes a non-transitory computer-readable medium that stores instructions executable by a processor to continuously detect user patterns of behavior with a home automation system, adaptively update one or more settings of the home automation system based on the detected patterns of behavior, and operate the home automation system based on the updated settings.

The patterns of behavior may be detected inside or outside a home being monitored by the home automation system. The one or more settings may control at least one of an HVAC system, a light fixture, and a lock mechanism. The home automation system may include at least one home security feature, and updating one or more settings may include updating the at least one home security feature. The patterns of behavior include exiting and entering the home. The user patterns of behavior may be detected using at least one of a motion sensor, an optical sensor, an infrared sensor, a power socket sensor, an appliance status sensor, and a light sensor.

A further embodiment relates to a computer-implemented method for controlling settings of a home automation system. The method includes continuously detecting at least one of user location patterns, user movement patterns, and user activity patterns with a home automation system, and adaptively updating one or more settings of the home automation system based on the detected patterns.

The method may also include establishing operation rules for future control of the one or more setting based on the detected patterns. One of the detected user activity patterns may include operating at least one electronic device. The method may include storing information about past detected patterns, and comparing information about current detected patterns to the information about past detected patterns. The method may include correlating the detected user patterns of behavior with date and time of day data, wherein adaptively updating the one or more settings of the home automation system is based in part on the date and time of day data.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the spirit and scope of the appended claims. Features which are believed to be characteristic of the concepts disclosed herein, both as to their organization and method of operation, together with associated advantages will be better understood from the following description when considered in connection with the accompanying figures. Each of the figures is provided for the purpose of illustration and description only, and not as a definition of the limits of the claims.

BRIEF DESCRIPTION OF THE DRAWINGS

A further understanding of the nature and advantages of the embodiments may be realized by reference to the following drawings. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

While the embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION

The systems and methods described herein relate to automation and security systems, such as home automation and home security, and related security systems and automation for use in commercial and business settings. More specifically, the systems and methods described herein relate to home automation systems, which may include security capabilities and provide access and/or control of security features for a home or commercial settings. Home automation system may be referred to as or include features of automation systems, security systems, and/or monitoring systems.

The systems and methods disclosed herein may relate to controlling features and functionality of a home and/or home automation system based at least in part on behavior of one or more users of a home automation system or occupants of a property being monitored by a home automation system. The term "user" may include owners, occupants, guests, customers, etc. of a home or other property. The home automation system may include at least one data collection device that monitors and/or collects data related to the user's behavior. The home automation system may also include a settings module that adjusts one or more automation/security devices or features associated with a property being monitored by the home automation system. The automation/security devices may include, for example, HVAC equipment, lighting, appliances, alarms, locks, sensors, cameras, and the like. The data collected about user behaviors may, collectively, produce a high level of certainty concerning what activities the user is engaged in and what the user intends for the home automation system to do in response to their behavior/activates. In one example, the home automation system, via data collected from at least one data collection device, may determine that a cell phone is plugged in for charging in a certain room of a home, appliances like TV's are turned off, and there is no motion detected in the home. The system also confirms a time of day that this data is collected (e.g., after 10:00 p.m.) and is able to determine with a high level of certainty that the user has gone to bed. The system then operates automation/security devices and/or systems of the home automation system, for example, to adjust a thermostat setting, turn off lighting, and arm a security feature according to predetermined rules or settings established by a user for that time of day (e.g., after 10:00 p.m.) and activity (e.g., gone to bed).

In another example, the user carries a geo-sense device (e.g., an app loaded on their cell phone) that the home automation system uses to track a location of the user. The home automation system may learn over time that the user commutes to a work location that is remote from the home on days Monday through Friday each week and resides at that place of business between approximately the hours of 8:00 a.m. and 5:00 p.m. When the system identifies departure of the user during daytime hours on one of those days, the home automation system may be adjusted into an "away from home" mode with certain lighting, thermostat settings, and security settings. When the system identifies that the user is leaving their place of business and returning home, the system may initiate an "occupy" mode based at least in part on a distance the user is from the home and an associated estimated amount of time of arrival. The system may be able to calculate an amount of time required to change a temperature within the home based on a number of factors such as, for example, the outdoor temperature, the existing indoor temperature, and the performance rating of an HVAC device for the home.

The home automation system may be operable to provide maximum energy efficiency and security measures while providing a desired level of comfort and security for the user. For example, the system may turn off most if not all of the lights of the home while the user is away, and turn on the interior and exterior lighting of the home when the user is traveling toward home and is determined to be within a predetermined distance of the home. The system may maintain the security features in an on and active state while the user is away, and turn off security features when the user is determined to be within a predetermined distance from the home or when a feature such as a garage door opener is actuated. The system may be able to adjust a temperature of the home based on another determined distance of the user relative to the home (e.g., a distance in which an estimated time of arrival is 20 minutes and the estimated time to raise or lower a temperature to an occupy condition is 20 minutes given current conditions).

Figure 1:
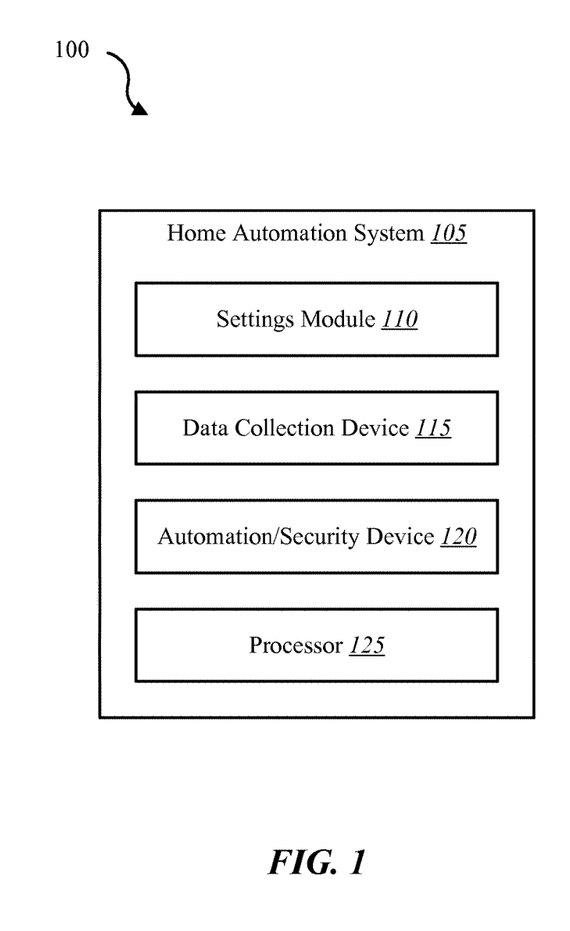
FIG. 1 is a block diagram of an environment in which the present systems and methods may be implemented.

FIG. 1 is a block diagram illustrating one example of an environment 100 in which the present systems and methods may be implemented. In some embodiments, the systems and methods described herein may be performed on a home automation system 105 (e.g., an automation system, a security system, or monitoring system for use with a home and/or business). The home automation system 105 may include a settings module 110, at least one data collection device 115, at least one automation/security device 120, and a processor 125.

Settings module 110 may receive data from data collection device 115 and cooperate with processor 125 to determine a user's behavior or intended functionality for the automation/security devices 120 of home automation system 105. Settings module 110 may command or instruct operation of automation/security device 120 to provide the automation/security functionality based on the user's behaviors. A plurality of data collection devices 115 may be implemented to determine different behaviors of a user. Data collection device 115 may include a plurality of sensors, cameras, tracking devices, feedback mechanisms, and the like to collect data about a user's behavior inside and/or outside a home (e.g., any building or premises monitored by home automation system 105). The sensors may include, for example, a camera sensor, an audio sensor, a forced entry sensor, a shock sensor, a proximity sensor, a boundary sensor, an appliance sensor, a light fixture sensor, a temperature sensor, a light beam sensor, a three dimensional (3-D) sensor, a motion sensor, a smoke sensor, a glass break sensor, a door sensor, a window sensor, a carbon monoxide sensor, an accelerometer, a global positioning system (GPS) sensor, a Wi-Fi positioning system sensor, a capacitance sensor, a radio frequency sensor, a near field sensor, a heart beat sensor, a breathing sensor, an oxygen sensor, a carbon dioxide sensor, a brain wave sensor, a movement sensor, a voice sensor, a touch sensor, and the like. The cameras may include video and still shot image devices. The camera may be integrated with one or more sensors.

The data collection device 115 may include other types of data collection devices such as, for example, data manually input by a user via, for example, a control panel, mobile computing device, desktop computing device, navigation system, gaming system, or appliance (e.g., television, HVAC, and the like). The data collection device 115 may also include devices that measure, for example, energy usage, water consumption, and energy generation (e.g., via solar, wind, geo-thermal or the like).

The data collected by data collection device 115 may be stored locally with the home automation system 105, or may be stored remotely via, for example, a back end system available via a network. Settings module 110 may determine trends based on the data received from data collection device 115. Settings module 110 may also "learn" from the history of behaviors of a user based on the data received from the data collection device 115. The historical data collected by data collection device 115 may be made available for the user to review and create settings for rules that are automatically carried out by home automation system 105 at various times of the day, on certain days of the week, or based on certain activities or behaviors of a user at any given time.

The home automation system 105 may be particularly useful in adjusting an HVAC setting of a home based on a user's behavior. The data collection device 115 may help determine if there are people in the home, and if so, the system may infer that the home is in an active state. The HVAC device may be the automation/security device 120 that is actuated by settings module 110 to warm or cool the house based on which people are in the home, the activity level of those persons, the time of day, etc. In one example, if the data collection device 115 indicates that the people are in an active state rather than motionless in their bedroom (e.g., a sleeping state), the HVAC setting may be different and/or adjusted accordingly. The data collection device 115 may include GPS data, motion detectors, cameras, accelerometers, etc. to infer if the people are in the home and performing a certain activity (e.g., watching TV in a family room, sleeping in bed, cooking in the kitchen, working at a desk, etc.). By collecting a sufficient number of data points, the settings module 110 may determine with a high level of certainty what activity the user is participating in and then automatically adjust the HVAC system in view of that activity. In one example, the HVAC system may be essentially shut off (e.g., a sleep state) when it is determined that the home is vacant and the user is a sufficient distance away from the home or moving in a direction away from the home. As a result, a maximum amount of energy is saved while the HVAC system goes into a sleep state until it is determined that the user is returning home and will arrive within a certain amount of time. Other automatic functions may occur relative to the HVAC system based on, for example, a determination that the user is in bed for the night versus other activities while the home is occupied or unoccupied.

Figure 2:
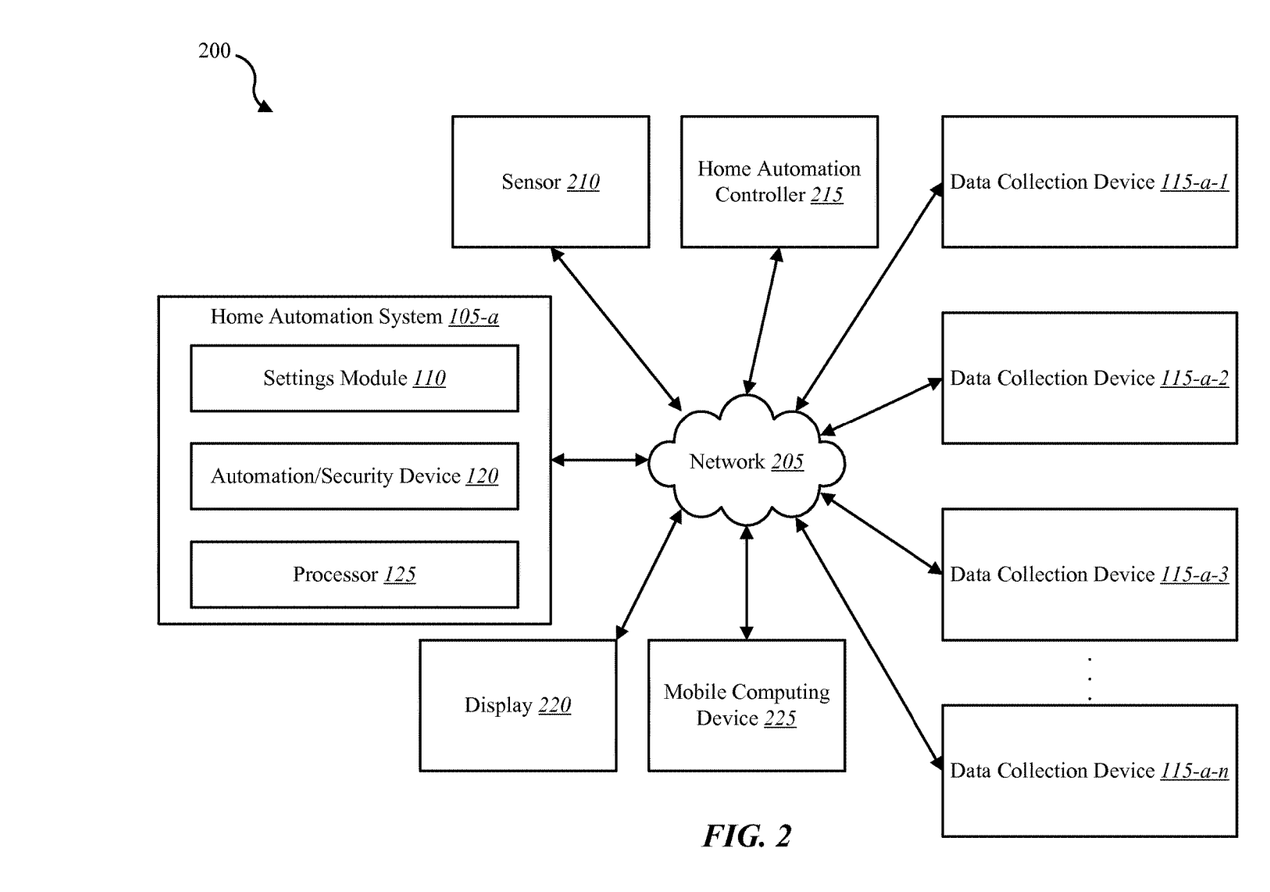
FIG. 2 is a block diagram of another environment in which the present systems and methods may be implemented.

Referring now to FIG. 2, in some embodiments, an environment 200 may include the components of environment 100 described above, and may further include a plurality of data collection devices 115-*a*-1-*n* and a number of additional features associated with a home automation system 105-*a*. Home automation system 105-*a* may be an example of home automation system 105 illustrated in FIG. 1. Data collection devices 115-*a*-1-*n* may be examples of data collection device 115 illustrated in FIG. 1. The home automation system 105-*a* may include settings module 110, automation/security device 120, and processor 125. Environment 200 may also include a sensor 210, an automation controller 215, a display 220, and a mobile computing device 225. A network 205 may interconnect home automation system 105-*a* with other features of environment 200. Network 205 provides communication via, for example, wired or wireless connections. Further, network 205 may include a plurality of communication mediums.

The plurality of data collection devices 115-*a*-1-*n* may collect various types of data and information related to one or more users' behavior. The collected data information may be delivered to settings module 110 via network 205. In at least some examples, sensor 210 may include at least one of the data collection devices 115-*a*-1-*n*, or any one of the data collection devices 115-*a*-1-*n* may include sensor 210. Settings module 110 may receive information and data from sensor 210, automation controller 215, display 220 and/or mobile computing device 225 as part of determining behavior of at least one user and commands for operation of automation/security device 120. Data collection devices 115-*a*-1-*n* may be positioned within a home or other premises monitored by home automation system 105-*a*, carried by one or more users, mounted in a transportation device (e.g., vehicle, bicycle, or the like), connected to a mobile piece of equipment (e.g., sports equipment, occupational tools, and the like), operable with an appliance, or connected to another object such as a pet. Data collection devices 115-*a*-1-*n* may be the same type of data collection device programmed for each of a plurality of users. In other examples, data collection devices 115-*a*-1-*n* may include a plurality of different data collection devices associated with one or more user.

Figure 3:
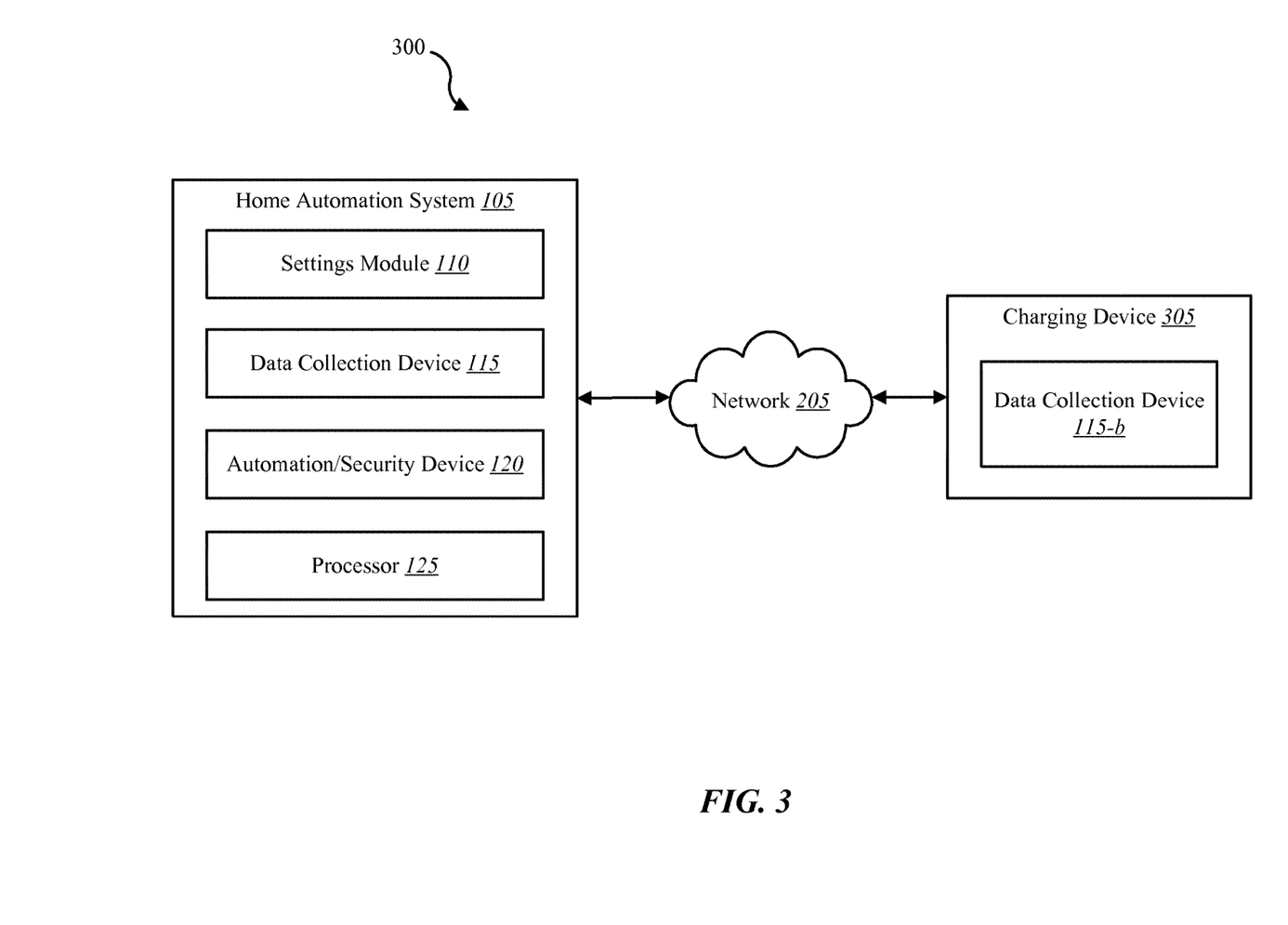
FIG. 3 is a block diagram of another environment in which the present systems and methods may be implemented.

Sensor 210 may represent one or more separate sensors or a combination of two or more sensors in a single sensor device. For example, sensor 210 may represent one or more camera sensors and one or more motion sensors connected to environment 300. Additionally, or alternatively, sensor 210 may represent a combination of sensors such as both a camera sensor and a motion sensor integrated into the same sensor device. Although sensor 210 is depicted as connected to home automation system 105-*a* via network 130, in some embodiments, sensor 210 may be connected directly to home automation system 105-*a*. Additionally, or alternatively, sensor 210 may be integrated into a home appliance or fixture such as a light bulb fixture. Sensor 210 may include an accelerometer to enable sensor 210 to detect movement of a user. Sensor 210 may include a wireless communication device with enables sensor 210 to send and receive data to and from one or more devices in environment 300. Additionally, or alternatively, sensor 210 may include a GPS sensor to enable sensor 210 to track a location of sensor 210. Sensor 210 may include a proximity sensor to enable sensor 210 to detect proximity of a user relative to a predetermined distance from a boundary (e.g. geo-fence). Sensor 210 may include one or more security detection sensors such as, for example, a glass break sensor, a motion detection sensor, or both. Additionally, or alternatively, sensor 210 may include a smoke detection sensor, a carbon monoxide sensor, or both. In at least some examples, sensor 210 may detect the presence of a user within a dwelling or in close proximity to a dwelling that is monitored by home automation system 105-a, perform certain functions (e.g., opening or closing a door or window), or speaking a voice command. As discussed above, sensor 210 may be integrated into any one of data collection devices 115-a-1-n or work in conjunction therewith to provide data to settings module 110 that represents various behavior of at least one user.

Automation controller 215 may provide features and functionality related to automation and/or security features of home automation system 105-a. Automation controller 215 may provide at least some of the logic, processing, and/or interaction among various components of home automation system 105-a. For example, automation controller 215 may include processor 125 or be included in processor 125. Automation controller 215 maybe operable to control at least in part the automation/security device 120 via, for example, instructions from settings module 110.

Display 220 may include, for example, a digital display as part of, for example, a control panel of home automation system 105-a. Display 220 may be provided via devices such as, for example, a desktop computer or mobile computing device 225. A user interface may be integrated into display 220. Such a user interface may include a plurality of menus, screens, microphones, speakers, cameras, and other capabilities that permit interaction between the user and home automation system 105-a or any other components of environment 200. Additionally, or alternatively, the user interface with display 220 may be integrated into mobile computing device 225, data collection devices 115-a-1-n, or other devices of environment 200.

In some embodiments, mobile computing device 225 may include one or more processors, one or more memory devices, and/or a storage device. Examples of mobile computing device 225 may include DVRs, personal video recorders (PVRs), and/or mobile computing devices, smart phones, personal computing devices, servers, etc. Home automation system 105-a may communicate with mobile computing device 225 based in part on any of the data collected by data collection device 115-a-1-n, decisions of settings module 110 related to control of automation/security device 120, or the like so that a user is aware of, for example, a current state, changing state, or activity associated with home automation system 105-a.

FIG. 3 illustrates another environment 300 that may include some components of environment 100 described above, and may further include a charging device 305 having at least one data collection device 115-b. Charging device 305 communicates with home automation system 105 via network 205. Operation of charging device 305 and/or data collection device 115-b may correspond with a particular behavior of the user.

In one example, charging device 305 is used to charge one or more of the user's electronic devices (e.g., a cell phone, laptop, or tablet computer). Data collection device 115-b may operate to provide information related to when and where charging device 305 is being operated. In one scenario, charging device 305 is operated in a user's bedroom, home automation system 105 determines that charging device 305 is operated during certain times of the day (e.g., after 12:00 p.m. and before 6:00 a.m.), and settings module 110 may ascertain with a high level of certainty that the user has chosen to go to bed. Settings module 110 may then update a setting of automation/security device 120 according to a nighttime setting (e.g., turn off lights, adjust HVAC setting, arm security system, etc.).

In at least some examples, data collection device 115-b is operated via the electronic device being charged. For example, data collection device 115-b may include or be incorporated into a downloadable app carried on the electronic device. The app generates a signal that is received by settings module 110 indicating that the electronic device is being charged via charging device 305.

In another example, data collection device 115-b includes a power consumption indicator that monitors the power being drawn by charging device 305, which indicates its use in charging a device. Data collection device 115-b may send data to settings module 110 indicating charging device 305 is in use rather than just being plugged into a socket. For example, data collection device 115-b may include a sensor associated with the socket into which the charging device 305 is plugged. Data collection device 115-b may be interposed between the socket and the plug for charging device 305.

In a further example, charging device 305 is a charging pad and includes data collection device 115-b integrated into charging device 305. The charging pad may charge the electronic device by simply setting the electronic device on top of or in contact with a surface of charging device 305, or in close proximity to a charging feature of charging device 305. Charging device 305 may include wired or wireless charging of an electronic device. Data collection device 115-b may communicate information about the charging event to settings module 110 after initiating charging of the electronic device.

Other features of environment 300 may help determined the location of charging device 305 (e.g., in a bedroom during nighttime hours indicating that the user is sleeping, or in an office during daytime hours indicating the user is working). In other examples, data collection device 115-b may provide information about a location of the charging device as well as the operation state of charging device 305.

While FIG. 3 illustrates a charging device 305 having a data collection device 115-b, other examples may include other types of devices whose operation may indicate certain behaviors of a user, particularly when combined with other data received by settings module 110. For example, a device that indicates a Wi-Fi connection or Wi-Fi usage is occurring, usage of a satellite television connection, operation of a hot water heater, operation of a kitchen appliance, door opener (e.g., garage door opener), operation of outdoor or indoor lighting, and the like may each involve a data collection device that provides information related to the usage of the device and corresponding behavior of the user.

Figure 4:
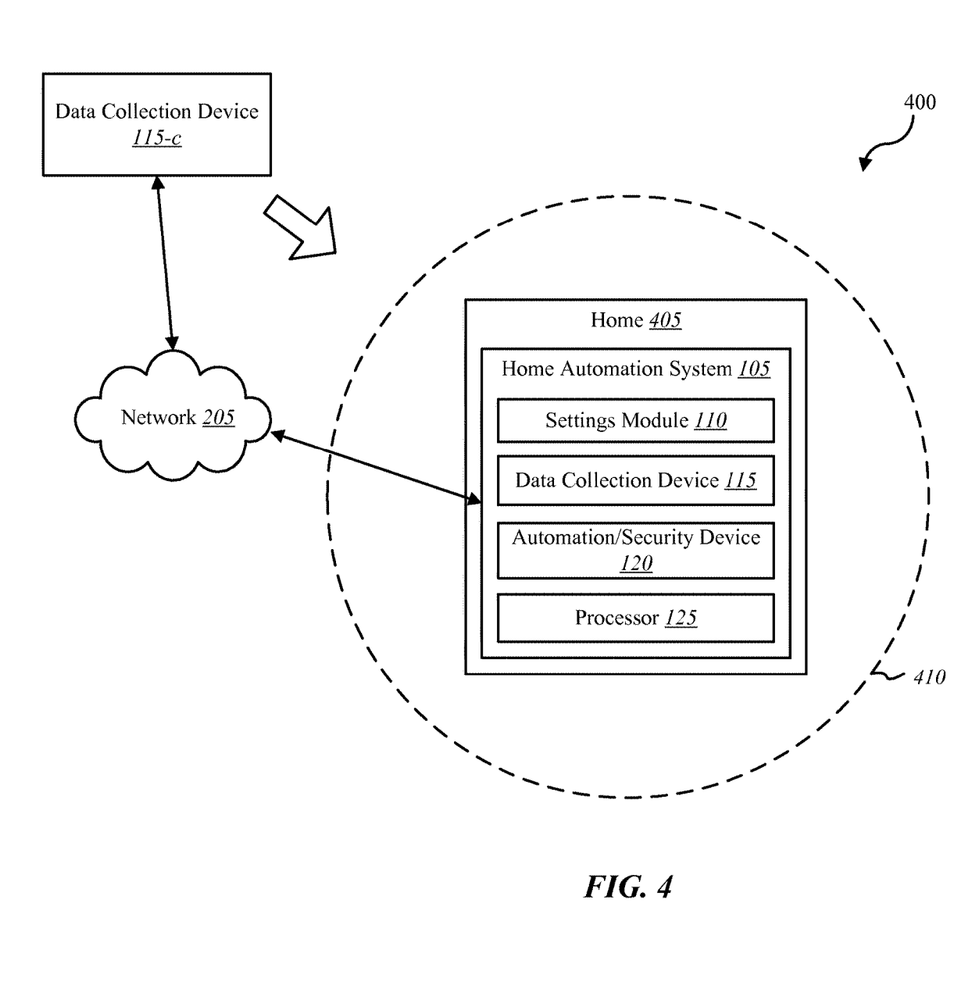
FIG. 4 is a block diagram of another environment in which the present systems and methods may be implemented.

FIG. 4 illustrates an environment 400 that may include the components of environment 100 described above, and may further include a home 405 within which home automation system 105 operates, a geo-boundary 410 (e.g., geo-fence), network 205, and a data collection device 115-c. Data collection device 115-c may be one example of data collection device 115 illustrated in FIG. 1 and included in home automation system 105.

Data collection device 115-c may include a tracking or positioning feature such as a GPS sensor and/or near field communication feature. Home automation system 105 may operate at least in part based on the proximity of data collection device 115-c relative to boundary 410 and/or home 405. Additionally, or alternatively, a direction of movement of data collection device 115-c or a speed of movement relative to boundary 410 and/or home 405 may be received by settings module 110 and used to determine operation of automation/security device 120 or other features of home automation system 105.

In one scenario, data collection device 115-c includes geo-sense capability (e.g., GPS) and is carried by an occupant of home 405, or is carried by the occupant's vehicle, equipment, etc. Home automation system 105 determines when the data collection device 115-c has left the premises of home 405 and/or boundary 410. Once the location of the occupant is confirmed as being away from home 405, settings module 110 may operate one or more automation/security devices 120 in accordance with an "away from home" or "daytime" mode preprogrammed by the user. In one example, the automation/security device 120 is an HVAC system that increases or decreases the temperature of home 405. Other features that may be adjusted include, for example, lighting, security settings, sensor settings, appliance settings, and the like. When home automation system 105 recognizes that data collection device 115-c is returning towards home 405 and/or boundary 410, or moves within a certain distance of home 405 or boundary 410, settings module 110 may operate automation/security device 120 into a different setting or mode (e.g., "daytime occupy mode"). For example, data collection device 115-c may indicate that the user is at a place of business and generally stationary for regular work hours (e.g., 8:00 a.m. to 5:00 p.m.). When data collection device 115-c indicates that the user has left the place of business, is traveling in the direction towards home 405 or boundary 410, and/or moves within a certain distance of home 405 and/or boundary 410, settings module 110 may actuate automation/security device 120 (e.g., operate an HVAC system to change a temperature, turn on lighting, turn off security settings, etc.).

Home automation system 105 may operate an algorithm that is used to determine how much time is required to adjust a temperature of home 405 to a desired level based on, for example, the model and/or capacity of the HVAC system, the temperatures inside and outside of the home, other weather conditions, the size of the home, etc. Based on the output of that algorithm, the distance from home indicated by data collection device 115-c used to trigger operation of automation/security device 120 may change. For example, the algorithm may determine that it takes 20 minutes to adjust the house temperature from 65 degrees up to 72 degrees (e.g., the daytime occupy temperature) based on current conditions. The user may initially be an hour away from home 405. Home automation system 105 tracks the location of the user via data collection device 115-c until the user reaches a point that is about 20 minutes from arrival at home. Settings module 110 then operates the HVAC system to adjust the temperature. Settings module 110 may operate other automation/security devices 120 at different times relative to the estimated time of arrival of the user. For example, settings module 110 may operate lighting when the user is within one minute of arrival, may adjust security settings to an off state only after the user arrives home (e.g., operates a garage door opener or approaches an exterior door), and unlocks the door at another time.

The resultant outcome of these automated features is the potential for conservation of energy and improved ease of interaction between the user and the home. Energy is conserved because certain automation/security features of the home are operated only when needed and are automatically set at levels corresponding to when and how the home is in use. Further, the automated features disclosed herein require limited input and interaction from the user in order to obtain the efficient control of the automation/security features. The input from the various data collection devices help the system determine regular human behaviors that can provide enough indicators to help the system react automatically for the benefit of the user, while the user is able to avoid having to learn how to use a large portion of the systems functionality and/or user interface. In essence, the system learns how to work with the user and adjusts according to particular patterns of behavior for those who occupy the home.

Figure 5:
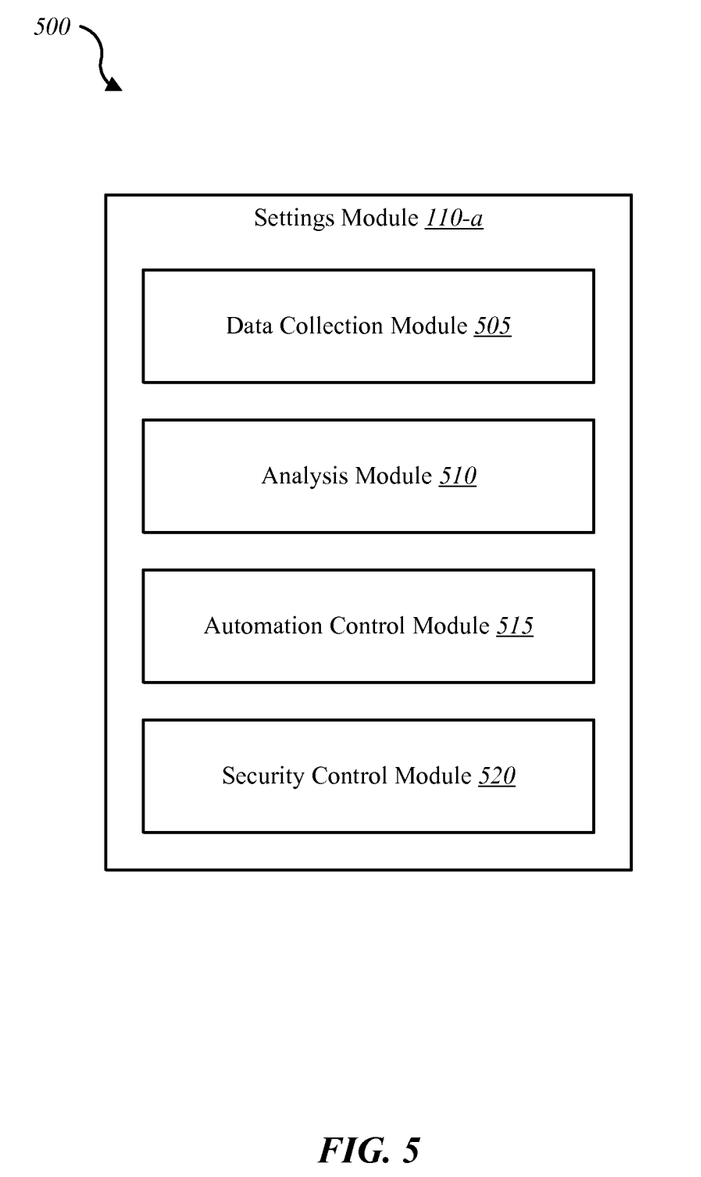
FIG. 5 is a block diagram of an example settings module of the environments shown in FIGS. 1-4.

FIG. 5 illustrates a block diagram of an environment 500 illustrating a settings module 110-a. Settings module 110-a may be one example of settings module 110 shown with reference to FIGS. 1, 2, 3 and/or 4. Settings module 110-a may include a data collection module 505, an analysis module 510, an automation control module 515, and a security control module 520.

The data collection module 505 may receive data from a number of sources including, for example, the data collection devices 115 described with reference to FIGS. 1-4. Data collection module 505 may receive data or information from other sources such as, for example, the sensor 210, automation controller 215, display 220, mobile computing device 225, and charging device shown in FIGS. 2 and/or 3. The data received by data collection module 505 may be received via a network (e.g., network 205 shown in FIGS. 2-4). The data received by data collection module 505 may be in various formats including, for example, sensor signals, manually input data, images, sounds, power consumption data, etc. The data received by data collection module 505 may be received from a plurality of different data collection devices or other devices and systems. The data collected by data collection module 505 may relate to one or more activities and/or behaviors of at least one user, occupant, guest or other person or object (e.g., pet) associated with a property such as a house or a commercial building.

Data collection module 505 may be configured to actively reach out to obtain certain data as opposed to passively accepting data. Data collection module 505 may include a plurality of separate modules carried on various devices and arranged for stationary or mobile use.

Analysis module 510 may receive data from data collection module 505 and determine, via the data, what type of behavior and/or activity the users may be engaged in. Analysis module 510 may, based on such determined behaviors/activities, determine whether further action is required related to automation/security features of the home automation system. In at least one example, analyzed data provided by analysis module 510 may be reviewed by automation control module 515. Automation control module 515 may generate instructions for operating at least one automation device or device, feature or functionality of a home automation system. The analyzed data from analysis module 510 may be received by security control module 520, which determines which, if any, security device, feature or functionality of the home automation system should be operated. Analysis module 510 may perform at least some comparison of current collected data to past collected data, aggregate data received from a plurality of different sources, compare collected data to benchmark data to determine if a threshold is met, and the like.

Settings module 110-a may operate in conjunction with a processor or controller (e.g., processor 125) of a home automation system as part of collecting data via data collection module 505, analyzing data via analysis module 510, or generating instructions related to automation/security devices via automation control module 515 or security control module 520. Settings module 110-*a* may include more or fewer modules and capabilities than other embodiments such as, for example, a database module that includes storage of proposed settings, rules, past data, etc. that may be considered by analysis module 510 or other aspects of settings module 110-*a*.

Figure 6:
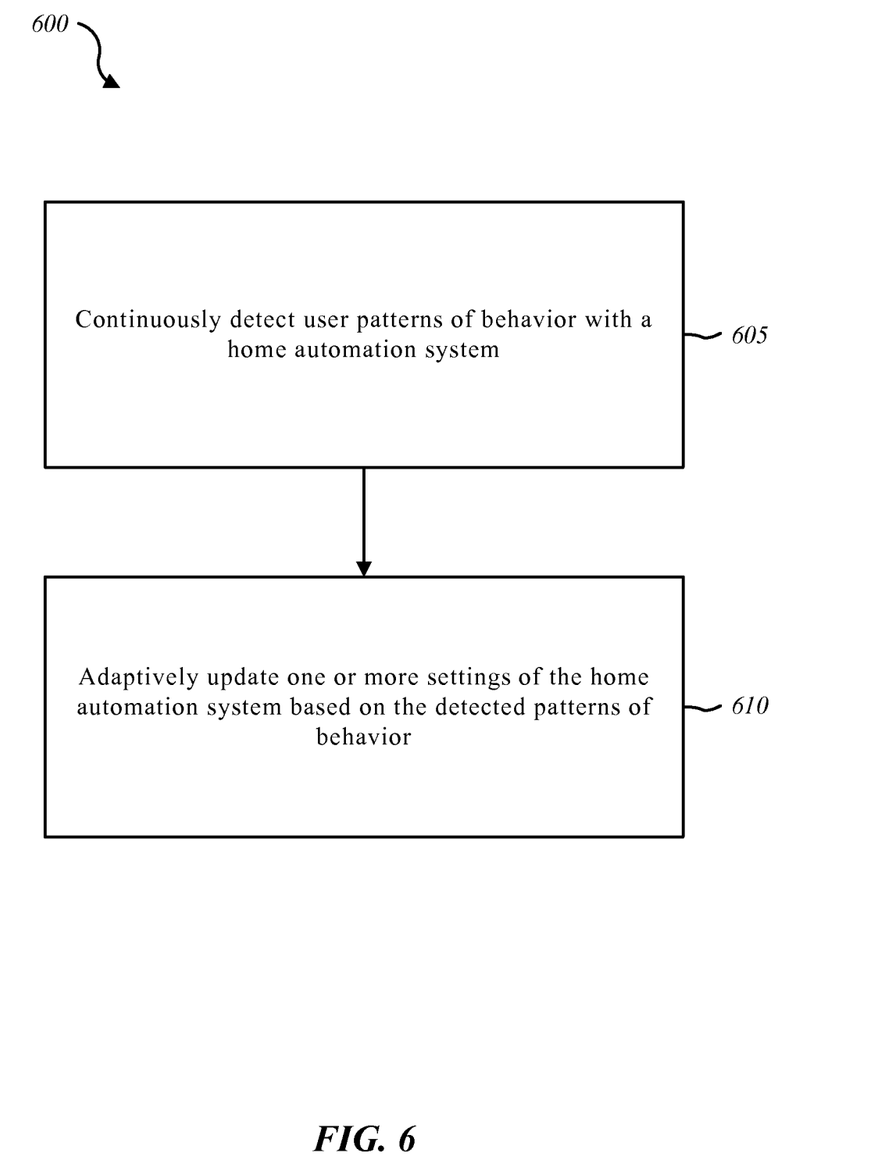
FIG. 6 is a flow diagram illustrating a method for controlling settings of an automation system.

FIG. 6 is a flow diagram illustrating one embodiment of a method 600 for controlling settings of a home automation system based at least in part on user behavior. In some configurations, the method 600 may be implemented by the settings module 110-*a* of home automation system 105 shown in FIGS. 1, 2, 3 and/or 4. In other examples, method 600 may be performed generally by home automation system 105 shown in FIGS. 1, 2, 3 and/or 4, or even more generally by the environments 100, 200, 300, 400 shown in FIGS. 1-4, respectively. In some configurations, method 600 may be implemented in conjunction with data collection devices 115 shown in FIGS. 1, 2, 3 and/or 4.

At block 605, method 600 includes continuously detecting user patterns of behavior with a home automation system. Block 610 includes adaptably updating one or more settings of the home automation system based on the detected patterns of behavior.

The user patters of behavior of the method 600 may be detected within a home that is monitored by the home automation system. The user patterns of behavior may be detected outside of the home that is monitored by the home automation system. The detected pattern of behavior may be based at least in part on a geo-fence signal (e.g., GPS). The home automation system may include security features, and the one or more settings may include a security setting related to at least one of the security features. The one or more settings may include an HVAC setting. The one or more settings may include at least one light fixture setting of a home that is monitored by the home automation system. The method 600 may also include determining a location of the user and updating the HVAC setting based on an estimated time of arrival of the user to the house and a determined location of the user. The one or more settings may include at least one lock mechanism setting for a barrier.

Figure 7:
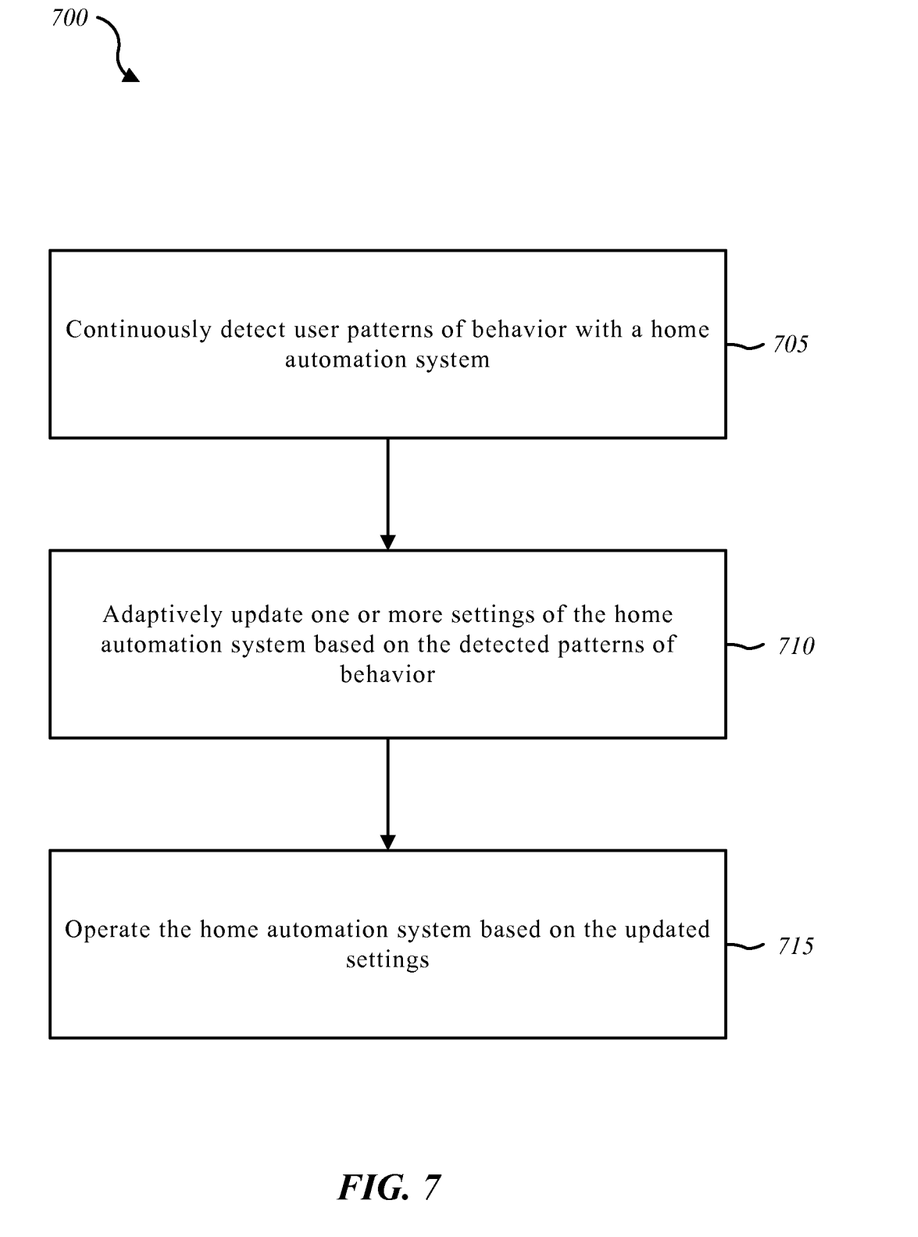
FIG. 7 is a flow diagram illustrating another method for controlling settings of an automation system.

FIG. 7 is a flow diagram illustrating one embodiment of a method 700 for controlling a home automation system based at least in part on a user's behavior. In some configurations, the method 700 may be implemented by the settings module 110 of home automation system 105 shown in FIGS. 1, 2, 3 and/or 4. In other examples, method 700 may be performed generally by home automation system 105 shown in FIGS. 1, 2, 3 and/or 4, or even more generally by the environments 100, 200, 300, 400 shown in FIGS. 1-4, respectively. In some configurations, method 700 may be implemented in conjunction with at least one data collection device 115 shown in FIGS. 1, 2, 3 and/or 4.

At block 705, method 700 includes continuously detecting user patterns of behavior with a home automation system. Block 710 includes adaptively updating one or more settings of the home automation system based on the detected patterns of behavior. At block 715, method 700 includes operating the home automation system based on the updated settings.

The patterns of behavior of the method 700 may be detected inside or outside a home being monitored by the home automation system. The one or more settings may control at least one of an HVAC system, a light fixture, and a lock mechanism. The home automation system may include at least one home security feature, and updating one or more settings may include updating the at least one home security feature. The user patterns of behavior may be detected using at least one of a motion sensor, an optical sensor, an infrared sensor, a power socket sensor, an appliance status sensor, and a light sensor.

Figure 8:
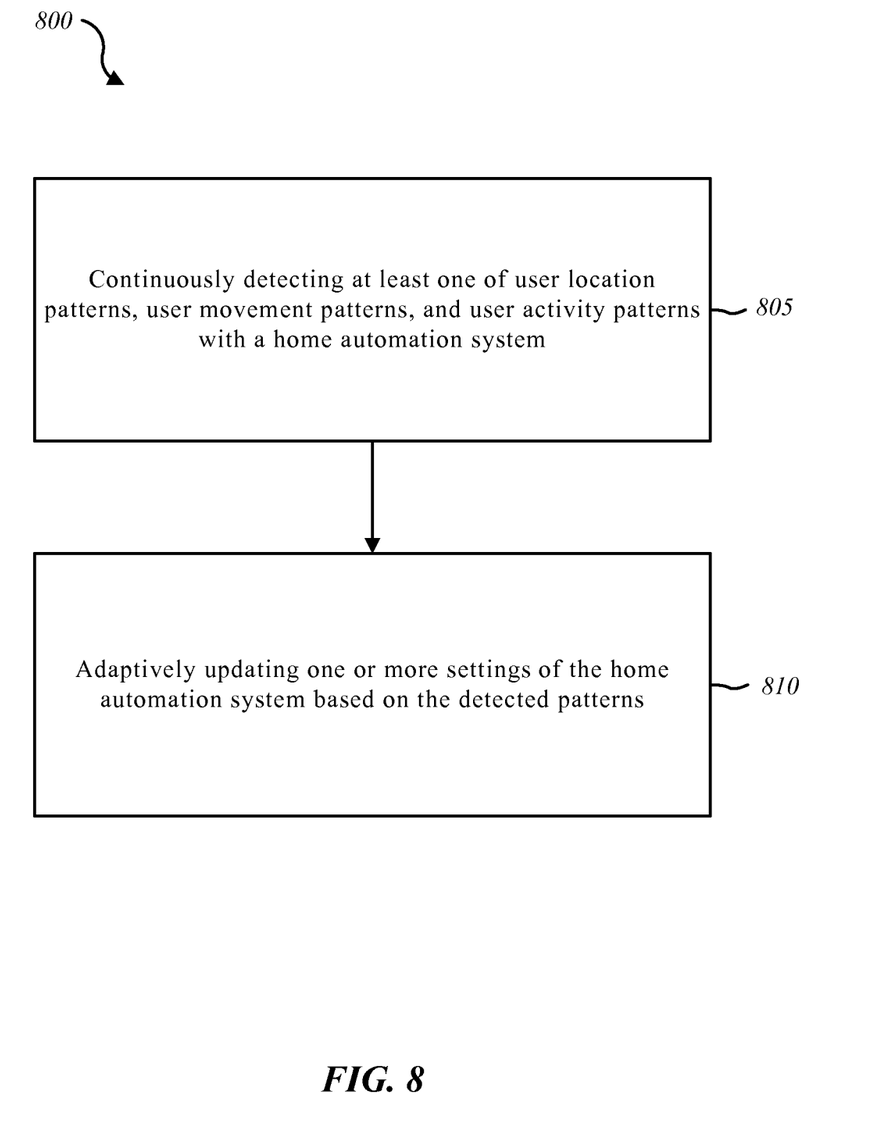
FIG. 8 is a flow diagram illustrating another method for controlling settings of an automation system.

FIG. 8 is a flow diagram illustrating one example of a method 800 for controlling settings of a home automation system based at least in part on user behavior. In some configurations, the method 800 may be implemented by the settings module 110 shown in FIGS. 1, 2, 3 and/or 4. In other examples, method 800 may be performed generally by home automation system 105 shown in FIGS. 1, 2, 3 and/or 4, or even more generally by the environments 100, 200, 300, 400 shown in FIGS. 1-4, respectively. In some configurations, method 800 may be implemented in conjunction with data collection devices 115 shown in FIGS. 1, 2, 3 and/or 4.

At block 805, the method 800 includes continuously detecting at least one of user location patterns, user movement patterns, and user activity patterns with the home automation system. Block 810 of method 800 includes adaptively updating one or more settings of the home automation system based on the detected patterns.

The method 800 may additionally include establishing operation rules for future control of the one or more settings based on the detected patterns. One of the detected user activity patterns may include operating at least one electronic device. The method 800 may include storing information about past detected patterns, and comparing information about current detected patterns to the information about past detected patterns. Method 800 may include correlating the detected user patterns of behavior with date and time of day data, wherein adaptively updating the one or more settings of the home automation system is based at least in part on the date and time of day data.

Figure 9:
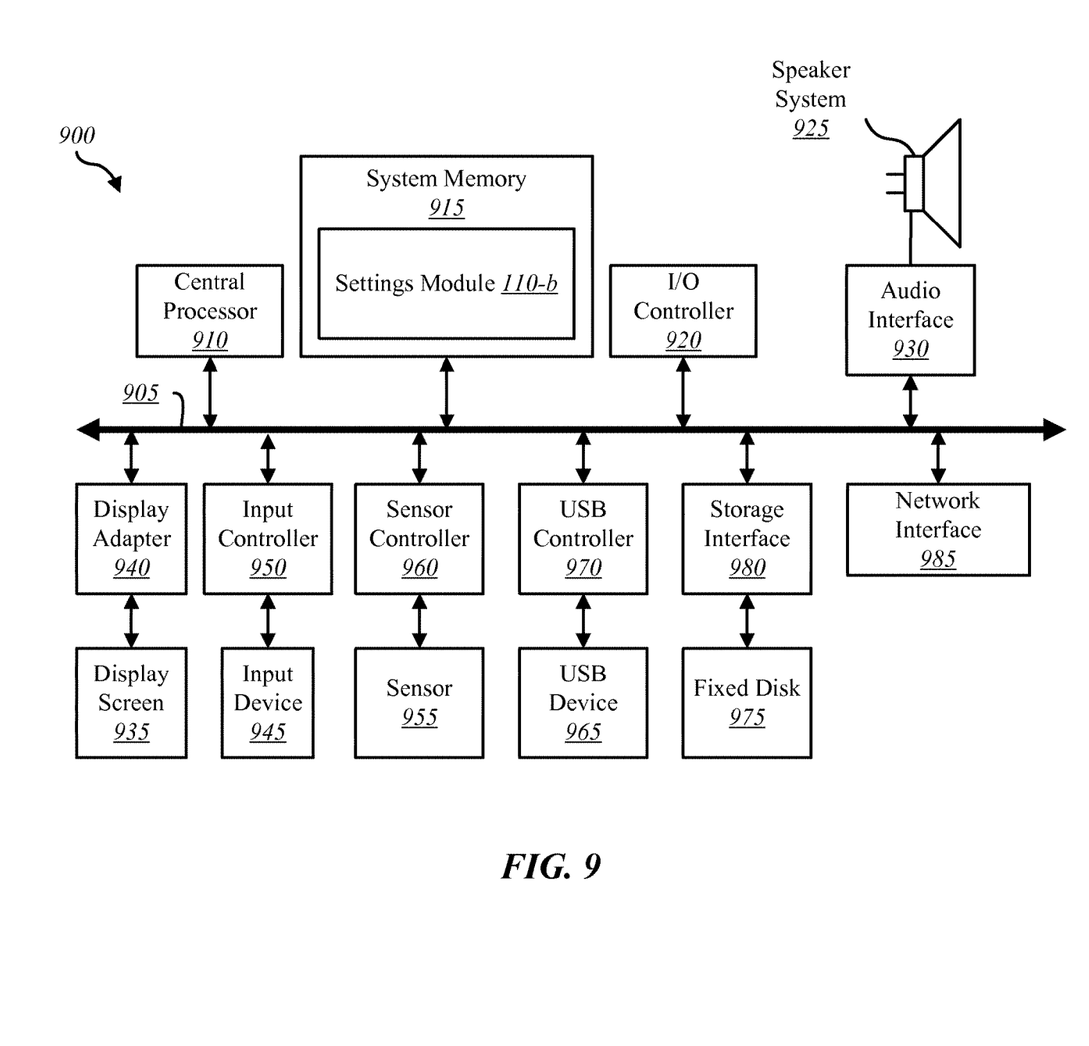
FIG. 9 is a block diagram of a computer system suitable for implementing the present systems and methods of FIGS. 1-8.

FIG. 9 depicts a block diagram of a controller 900 suitable for implementing the present systems and methods. The controller 900 may be an example of the home automation system 105, home automation controller 215, and/or mobile computing device 225, illustrated in FIGS. 1 and/or 2. In one configuration, controller 900 includes a bus 905 which interconnects major subsystems of controller 900, such as a central processor 910, a system memory 915 (typically RAM, but which may also include ROM, flash RAM, or the like), an input/output controller 920, an external audio device, such as a speaker system 925 via an audio output interface 930, an external device, such as a display screen 935 via display adapter 940, an input device 945 (e.g., remote control device interfaced with an input controller 950), multiple USB devices 965 (interfaced with a USB controller 970), and a storage interface 980. Also included are at least one sensor 955 connected to bus 905 through a sensor controller 960 and a network interface 985 (coupled directly to bus 905).

Bus 905 allows data communication between central processor 910 and system memory 915, which may include read-only memory (ROM) or flash memory (neither shown), and random access memory (RAM) (not shown), as previously noted. The RAM is generally the main memory into which the operating system and application programs are loaded. The ROM or flash memory can contain, among other code, the Basic Input-Output system (BIOS) which controls basic hardware operation such as the interaction with peripheral components or devices. For example, a settings module 110-*b* to implement the present systems and methods may be stored within the system memory 915. The settings module 110-*b* may be an example of the settings module 110 illustrated in FIGS. 1, 2, 3 and/or 4. Applications resident with controller 900 are generally stored on and accessed via a non-transitory computer readable medium, such as a hard disk drive (e.g., fixed disk 975) or other storage medium. Additionally, applications can be in the form of electronic signals modulated in accordance with the application and data communication technology when accessed via interface 985.

Storage interface 980, as with the other storage interfaces of controller 900, can connect to a standard computer readable medium for storage and/or retrieval of information, such as a fixed disk drive 975. Fixed disk drive 975 may be a part of controller 900 or may be separate and accessed through other interface systems. Network interface 985 may provide a direct connection to a remote server via a direct network link to the Internet via a POP (point of presence). Network interface 985 may provide such connection using wireless techniques, including digital cellular telephone connection, Cellular Digital Packet Data (CDPD) connection, digital satellite data connection, or the like. In some embodiments, one or more sensors (e.g., motion sensor, smoke sensor, glass break sensor, door sensor, window sensor, carbon monoxide sensor, and the like) connect to controller 900 wirelessly via network interface 985.

Many other devices or subsystems (not shown) may be connected in a similar manner (e.g., entertainment system, computing device, remote cameras, wireless key fob, wall mounted user interface device, cell radio module, battery, alarm siren, door lock, lighting system, thermostat, home appliance monitor, utility equipment monitor, and so on). Conversely, all of the devices shown in FIG. 9 need not be present to practice the present systems and methods. The devices and subsystems can be interconnected in different ways from that shown in FIG. 9. The aspect of some operations of a system such as that shown in FIG. 9 are readily known in the art and are not discussed in detail in this application. Code to implement the present disclosure can be stored in a non-transitory computer-readable medium such as one or more of system memory 915 or fixed disk 975. The operating system provided on controller 900 may be iOS®, ANDROID®, MS-DOS®, MS-WINDOWS®, OS/2®, UNIX®, LINUX®, or another known operating system.

Moreover, regarding the signals described herein, those skilled in the art will recognize that a signal can be directly transmitted from a first block to a second block, or a signal can be modified (e.g., amplified, attenuated, delayed, latched, buffered, inverted, filtered, or otherwise modified) between the blocks. Although the signals of the above described embodiment are characterized as transmitted from one block to the next, other embodiments of the present systems and methods may include modified signals in place of such directly transmitted signals as long as the informational and/or functional aspect of the signal is transmitted between blocks. To some extent, a signal input at a second block can be conceptualized as a second signal derived from a first signal output from a first block due to physical limitations of the circuitry involved (e.g., there will inevitably be some attenuation and delay). Therefore, as used herein, a second signal derived from a first signal includes the first signal or any modifications to the first signal, whether due to circuit limitations or due to passage through other circuit elements which do not change the informational and/or final functional aspect of the first signal.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

Furthermore, while various embodiments have been described and/or illustrated herein in the context of fully functional computing systems, one or more of these exemplary embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the present systems and methods and their practical applications, to thereby enable others skilled in the art to best utilize the present systems and methods and various embodiments with various modifications as may be suited to the particular use contemplated.

Unless otherwise noted, the terms "a" or "an," as used in the specification and claims, are to be construed as meaning "at least one of." In addition, for ease of use, the words "including" and "having," as used in the specification and claims, are interchangeable with and have the same meaning as the word "comprising." In addition, the term "based on" as used in the specification and the claims is to be construed as meaning "based at least upon."

What is clamed is:

1. An apparatus for controlling settings of a home automation system, comprising:
 a processor;
 a memory in electronic communication with the processor; and
 instructions stored in the memory, the instructions being executable by the processor to:
 detect user patterns of behavior associated with a home automation system, the detected user patterns of behavior being aggregated at the home automation system;
 request and selectively obtain direction data from a device associated with a user based on a location of the user relative to a location associated with the home automation system, the direction data indicating a directional movement of the user relative to the location associated with the home automation system and a type of behavior of the user;
operate one or more settings of the home automation system in a predefined mode based at least in part on the directional movement of the user;
compare the direction data with the detected user patterns of behavior aggregated at the home automation system;
determine at least one setting of the home automation system associated with the user based at least in part on the comparison and the type of behavior of the user;
determine an occupancy at the location associated with the home automation system based at least in part on utility data at the location associated with the home automation system; and
adaptively update the one or more settings of the home automation system operated in the predefined mode based at least in part on the at least one setting associated with the user and the occupancy at the location associated with the home automation system.

2. The apparatus of claim 1, wherein the user patterns of behavior are detected within a home monitored by the home automation system.

3. The apparatus of claim 1, wherein the user patterns of behavior are detected outside a home monitored by the home automation system.

4. The apparatus of claim 1, wherein the detected pattern of behavior is based at least in part on a geo-fence signal.

5. The apparatus of claim 1, wherein the home automation system comprises security features, and the one or more settings of the home automation system includes a security setting related to at least one of the security features.

6. The apparatus of claim 1, wherein the one or more settings of the home automation system comprises an HVAC setting.

7. The apparatus of claim 6, wherein the instructions are executable by the processor to:
determine a location of the user; and
update the HVAC setting based at least in part on an estimated time of arrival of the user to a home and the determined location of the user.

8. The apparatus of claim 1, wherein the one or more settings of the home automation system comprises at least one light fixture setting of a home monitored by the home automation system.

9. The apparatus of claim 1, wherein the one or more settings of the home automation system comprises at least one lock mechanism setting for a barrier.

10. A computer-program product for controlling a home automation system, the computer-program product comprising a non-transitory computer-readable medium storing instructions executable by a processor to:
detect user patterns of behavior with the home automation system, the detected user patterns of behavior being aggregated at the home automation system;
determine at least one setting of the home automation system associated with a user based at least in part on the detected user patterns of behavior aggregated at the home automation system;
determine an occupancy at a location of the home automation system based at least in part on utility data at the location associated with the home automation system;
request and selectively obtain direction date associated with one or more devices associated with the user based on a location of the user relative to a location associated with the home automation system, the direction data from the one or more devices indicating a directional movement and a type of behavior of the user;
operate one or more settings of the home automation system in a predefined mode based at least in part on the directional movement of the user;
track a distance between a location of the user and the location of the home automation system, the location of the user being different from the location of the home automation system;
determine a duration to perform a function, associated with the detected patterns of behavior aggregated at the home automation system and the type of behavior of the user, of the home automation system based at least in part on a characteristic associated with the function and the tracking;
adaptively update, in response to the duration to perform the function, the one or more settings associated with the function of the home automation system based at least in part on the at least one setting associated with the user and the occupancy at the location of the home automation system; and
operate the home automation system based at least in part on the updated settings.

11. The computer-program product of claim 10, wherein the patterns of behavior are detected inside or outside a home being monitored by the home automation system.

12. The computer-program product of claim 10, wherein the one or more settings control at least one of an HVAC system, a light fixture, and a lock mechanism.

13. The computer-program product of claim 10, wherein the home automation system comprises at least one home security feature, and updating one or more settings comprises updating the at least one home security feature.

14. The computer-program product of claim 10, wherein the patterns of behavior comprise exiting and entering a home.

15. The computer-program product of claim 10, wherein the user patterns of behavior are detected using at least one of a motion sensor, an optical sensor, an infrared sensor, a power socket sensor, an appliance status sensor, and a light sensor.

16. A computer-implemented method for controlling settings of a home automation system, comprising:
detecting user location patterns, user direction and movement patterns, user activity patterns, and a type of behavior of a user with a home automation system, the detected user location patterns, the user movement patterns, user activity patterns, and the type of behavior of the user of being aggregated at the home automation system;
requesting and selectively obtaining, via an application installed on a device associated with the user, a power consumption indicator associated with the device and direction data based on a location of the user relative to a location associated with the home automation system, the direction data indicating a directional movement of the user relative to the location associated with the home automation system and a type of behavior of the user;
operating one or more settings of the home automation system in a predefined mode based at least in part on the directional movement of the user;
determining that the device of the user is in use based at least in part on the power consumption indicator; and
adaptively updating the one or more settings of the home automation system operated in the predefined mode based at least in part on the detected patterns aggregated at the home automation system, the type of behavior of the user, and the determining that the device of the user is in use.

17. The method of claim 16, further comprising:
establishing operation rules for future control of the one or more setting based at least in part on the detected patterns.

18. The method of claim 17, wherein one of the detected user activity patterns comprises operating at least one electronic device.

19. The method of claim 16, further comprising:
storing information about past detected patterns; and
comparing information about current detected patterns to the information about past detected patterns.

20. The method of claim 16, further comprising:
correlating the detected user patterns of behavior with date and time of day data, wherein adaptively updating the one or more settings of the home automation system is based at least in part on the date and time of day data.

* * * * *